United States Patent [19]

Citta

[11] Patent Number: 5,461,674
[45] Date of Patent: Oct. 24, 1995

[54] METHOD AND APPARATUS FOR CONTROLLING PLAYBACK OF RECORDED HDTV SIGNALS

[75] Inventor: Richard W. Citta, Oak Park, Ill.

[73] Assignee: Zenith Electronics Corp., Glenview, Ill.

[21] Appl. No.: 887,723

[22] Filed: May 22, 1992

[51] Int. Cl.$^6$ .................................................. H04N 7/67
[52] U.S. Cl. .................................. 380/10; 380/5; 380/20
[58] Field of Search ........................... 380/4, 5, 10, 20, 380/23, 46, 49, 50

[56] References Cited

U.S. PATENT DOCUMENTS 4,670,857  6/1987  Rackman .................................. 380/4
5,016,272  5/1991  Stubbs et al. ............................ 380/5

Primary Examiner—Bernarr E. Gregory

[57] ABSTRACT

An HDTV receiver for restricting playback of HDTV signals encrypted with a level 1 encryption. The receiver includes an output port and an input port between which an external, controllable level 1 decryption apparatus is connected. The receiver includes a level 2 encryption circuit coupled to the output port and a level 2 decryption circuit coupled to the input port. The level 1 external decryption apparatus may be controllable from a cable head end, a smart card or a built-in algorithm to control the number of playbacks of recorded level 1 encrypted HDTV signals.

14 Claims, 2 Drawing Sheets

METHOD AND APPARATUS FOR CONTROLLING PLAYBACK OF RECORDED HDTV SIGNALS

BACKGROUND OF THE INVENTION AND PRIOR ART

This invention relates in general to HDTV signals and in particular to a method and apparatus for controlling the number of playbacks of recorded HDTV signals.

HDTV (high definition television) is rapidly becoming a reality and promises theater-like large screen video presentations in a home environment. HDTV signals extending to 37 MHz, as presently contemplated, will be transmitted in conventional 6 MHz bandwidth television channels. The HDTV signal will be compressed by any of a well known variety of signal compression techniques to enable transmission of the wide band signal in a conventional channel band without substantial loss of information.

The potential of theater quality video and high fidelity audio in a viewer's home makes HDTV a very marketable product. A natural question arises as to what, if any, security measures should be taken to preserve the normal "box office" for movies and other broadcast events. Presently super VHS tape recorders can accommodate a signal bandwidth of approximately 5.5 MHz. Consequently the means are presently available for recording compressed video HDTV programs and for copying prerecorded tapes of movies and the like in the HDTV format.

The solution to the "copying" problem adopted by the movie industry, which provides a great deal of the entertainment for television, is to exploit the normal box office market for new movie releases or special events before televising the movies or special events, or releasing them on video cassette. Ideally the industry should be able to simultaneously release a movie, televise it and make it available in recorded form without destroying the normal box office potential of the movie.

In cable television systems, the movie channels or premium services channels offer only movies that have already been exhibited in theaters. This normally occurs six months to a year after the normal box office release and the value of the premium service is significantly diminished as a result. While the movie industry realizes substantial revenue through the sale and rental of prerecorded tapes of movies, it must balance its loss of revenue from theater presentations when releasing them in broadcast or prerecorded form. The common solution is to delay the television and tape release of the movie, which entails additional advertising costs, precludes a unified marketing plan and loses the time advantage of simultaneous release.

At present, broadcasting a movie on an NTSC 6 MHz television channel makes it instantly available for copying with existing low cost tape recording equipment. This, of course, seriously impacts the subsequent tape rental market for that movie. Similarly, releasing a prerecorded tape of a movie at or near the time of the box office release can seriously erode the box office market. The result is that a unified cost-effective simultaneous release of a movie or event cannot presently be made without significant economic consequences. While the movie industry is not fundamentally opposed to the taping of their offerings—they want to be compensated for their product. If there were a way to realize a "return on investment" for each viewing of a movie, whether in a theater environment or in a home environment, the movie industry would favor it.

The advent of HDTV signals and their large 34 MHz bandwidth dramatically changes the situation since the equipment that is capable of recording such signals is prohibitively expensive. The HDTV signal in its transmitted compressed and encrypted form, however, is still capable of being recorded by present day, reasonably priced, super VHS tape recorders. The manifest desire to make first-run movies immediately available for display on home HDTV receivers and the above-described state of the art provided the impetus for the present invention.

OBJECTS OF THE INVENTION

A principal object of the invention is to provide a method and apparatus for controlling the playback of recorded HDTV signals.

Another object of the invention is to provide a means for enabling the contemporaneous release of box office and recorded entertainment without significant negative economic impact.

A further object of the invention is to provide a means for restricting the playback of encrypted material.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
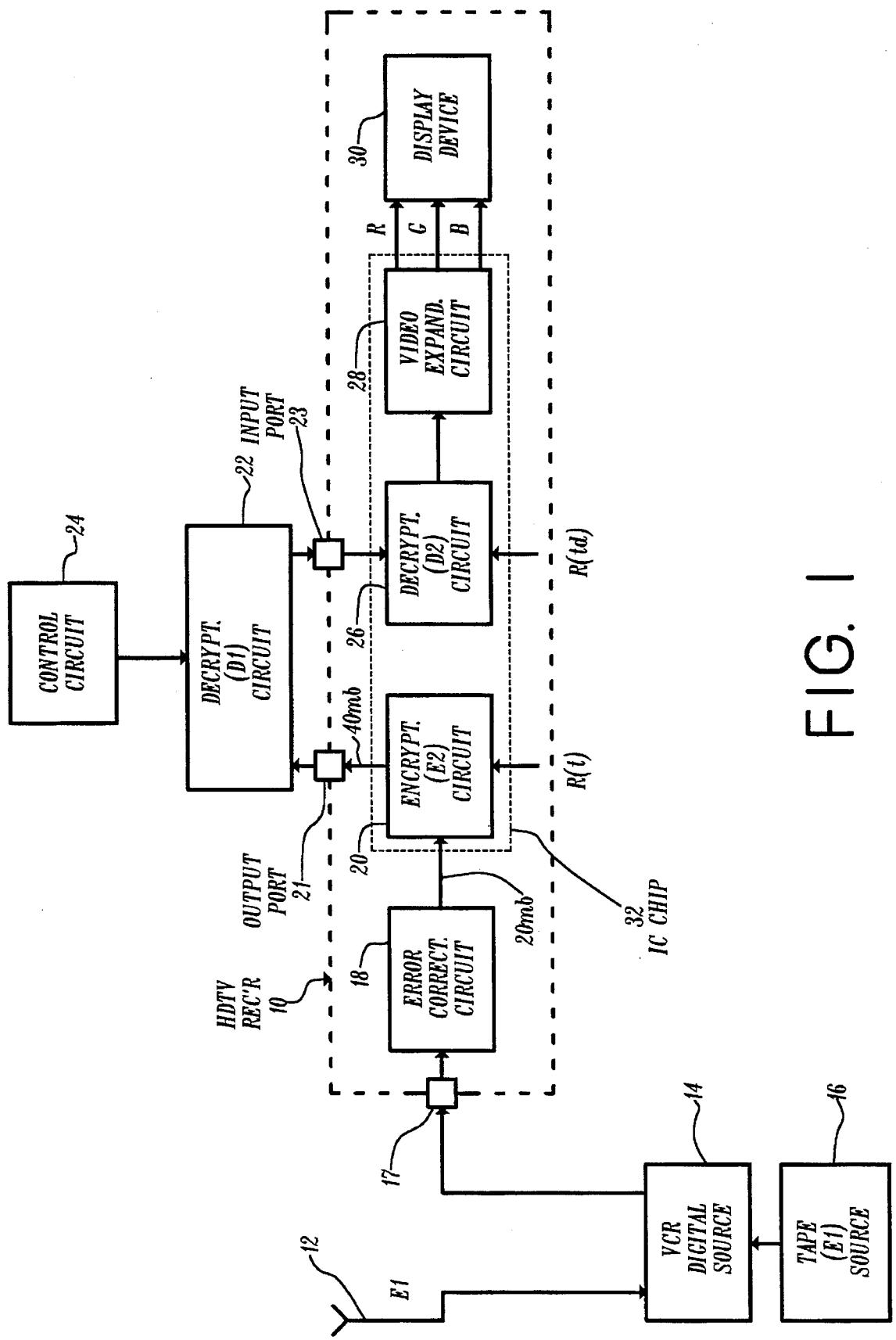
FIG. 1 is a simplified block diagram of a playback control system operated in accordance with the invention.

Referring to the drawing, an HDTV receiver 10 is generally indicated by a dashed line block. An antenna 12 (or a cable input source) supplies an HDTV signal compressed for transmission through a 6 MHz television channel and encrypted with a first encryption level (a level 1 encryption E1) to the input of a VCR 14. VCR 14 is indicated as being digital since the FCC (Federal Communications Commission) has strongly indicated that the HDTV standards to be adopted for the United States will include digital transmission. The output of VCR 14 is coupled to an input terminal 17 on HDTV receiver 10. A tape 16, bearing signals with level 1 encryption, is shown as being usable with VCR 14 for playback through receiver 10. Since the signal applied to input terminal 17 of television receiver 10 will be digital, an error correction circuit 18 is provided. This error correcting technology is well known and readily available. It enables repeated playing of recorded material without significant deterioration as well as noise-free playback of broadcast material. The output of error correction circuit 18 is applied to an encryption means 20 for subjecting all input signals to a level 2 encryption (E2). The output signal of encryption means 20 is applied to an output port 21 on receiver 10 and coupled to a decryption means 22 that provides a level 1 decryption (D1) of input signals. The 6 MHz bandwidth HDTV signal, after level 1 decryption, is still encrypted with level 2. The level 2 encrypted signal is supplied back to an input port 23 on receiver 10 from whence it is coupled to a decryption means 26 that decrypts level 2 encryptions (D2). A control circuit 24 is coupled to decryption means 22 and controls the operability of the decryption means, as will be explained in more detail. The output of level 2 decryption means 26 is coupled to a video expansion (decompression) circuit 28 where the compressed HDTV signal is expanded to produce R, G and B signals of about 34 MHz bandwidth. These signals are applied to a suitable display means 30 for providing the HDTV display. It will be appreciated that audio circuits, timing circuits and data receiving circuits and the like have been omitted for the sake of clarity since they are not germane to the invention.

The levels of encryption which are identified as level 1 and level 2 may take any of a well known number of forms, the stream cipher types being preferred. In an all digital format, encryption is readily obtained by multiplying the signal by a multiplier or a key and decryption is accomplished by simply multiplying again with the same multiplier or key. The process does not result in extension of the signal bandwidth. Other types of encryption increase the bit rate significantly and may be used advantageously in the HDTV environment. For example, while the signal at VCR 14 may have a data rate of about 20 megabits, the signals from encryption means 20 (and received by decryption means 26) may have a data rate of about 40 megabits. This 40 megabit data rate is sufficiently high to preclude present day (and foreseeable future) reasonably priced equipment from recording it. Since the decrypted level 1 signal is only available at input port 23, and is in a form that is "not recordable" (i.e. at a 40 megabit data rate), a first degree of protection against unauthorized copying (piracy) is obtained. A second level of protection is provided in that the 40 megabit signal is further encrypted and must be decrypted by decryption means 26 in the HDTV receiver. The encryption and decryption algorithm for level 2 is preferably a time variable function key that is embedded in a software chip that also includes encryptor 20, decryptor 26 and expander 28 as indicated by the dotted line rectangle 32. This makes it extremely unlikely that a would-be pirate could break the encryption algorithm. The time-varying nature of the algorithm is indicated by the arrows R(t) and R(td) to encryption means 20 and decryption means 26 respectively. R(t) as mentioned, is a function of time (t) and R(td) is that same key R(t) with a fixed delay (d). The decryption means 26 is arranged to include this with fixed time delay (d). Thus, not only must the signal be appropriately decrypted, but it also must have the correct time delay (d). This provides another degree of protection for very little additional cost or complexity.

Figure 2:
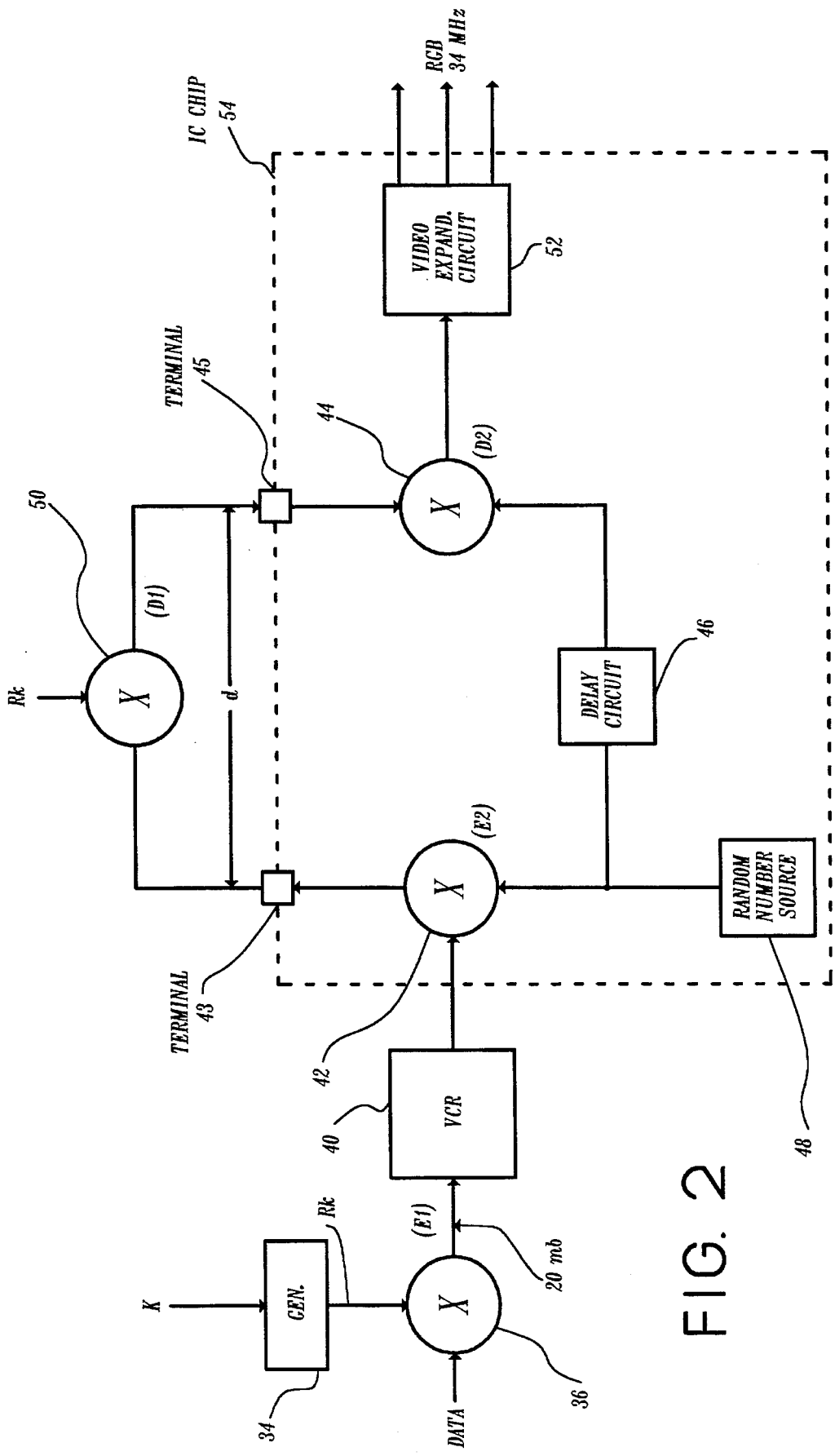
FIG. 2 is a more detailed showing of the preferred form of the invention in FIG. 1.

The system in FIG. 2 illustrates a preferred embodiment of the encryption/decryption aspects of the invention in FIG. 1. Rather than increase the data rate, the FIG. 2 embodiment encrypts to level 2 with a true random number-one that is impossible to decrypt (without obtaining access to the silicon in the chip). The true random variable key is called Ro and the stream-cipher system is used throughout. Data is supplied to a multiplier 36 along with a signal Rk. Rk results from a pseudo-random number generator 34 that is keyed by a key (k). The output of multiplier 36 is a level 1 encrypted signal that has approximately a 20 megabit data rate. A VCR 40 is shown in the signal path and its output is supplied to a multiplier 42 which is also supplied with a random number input Ro from a source 48. A delay circuit 46 introduces delay (d) to Ro and applies the delayed Ro input to a multiplier 44. The output of multiplier 42 is a level 1 and level 2 encrypted signal which is available at a terminal 43. A level 1 decryptor consists of a multiplier 50 supplied with an input of Rk and the output of multiplier 42. The output of multiplier 50, which is a level 2 encrypted signal (level 1 having been just decrypted) is supplied to a terminal 45 where the signal is coupled to multiplier 44 for level 2 decryption. Here again, a fixed delay (d) is introduced by the decryption apparatus connected to terminals 43 and 45 and all of the level 2 encryption and decryption and video expansion circuit 52 are embedded in a chip 54.

The truly random key Ro may be produced in a variety of ways. For example, a zener diode that is biased at its threshold exhibits a great deal of noise. Suitable amplification of such noise followed by a conversion to a digital number makes a truly random Ro. As those skilled in the art will readily appreciate, the delay (d) will be established (by the manufacturer) and made known so that manufacturers of level 1 decryption equipment (cable companies) may design the fixed delay into their equipment.

In operation (FIG. 1), the HDTV signal is compressed and subjected to a level 1 encryption. The level 1 signal is processed by HDTV receiver 10 and further encrypted to a level 2 by encryption means 20. The level 1 and level 2 encrypted signal is level 1 decrypted in decryption means 22 and returned as a level 2 encrypted signal to decryption means 26 where it is level 2 decrypted to produce the compressed HDTV signal. The compressed signal is decompressed or expanded in decompression circuit 28 and sent to display means 30.

Should a level 1 encrypted HDTV signal be recorded or be made available on a tape 16, it will be played back through the HDTV receiver 10 with the level 1 encrypted signal being further encrypted to level 2 as described. Decryptor 22 decrypts the level 1 signal and the level 2 signal is decrypted in decryptor 26. Expansion of the fully decrypted signal then takes place and the signal is displayed.

For obvious reasons, a movie company would not make available unencrypted tapes of the HDTV program material or permit an unencrypted HDTV program to be broadcast when the movie is box office released. Thus the only available signal (tape or broadcast) for processing by HDTV receiver 10 is one that requires level 1 decryption by decryption means 22. As mentioned, decryption means 22 is controlled by the cable head end, or by a suitable "smart card" that would accompany the prerecorded level 1 encrypted tape to control the number of times the tape may be played. The "number of plays" would obviously be determined by the amount of the rental or other fee paid. Decryption means 22 could be readily programmed by the cable head end to permit a predetermined number of plays of the tape for a fixed charge or to record the number of plays of the tape for billing purposes. The number of plays permitted could readily be indicated in a header accompanying the program.

Taping the signal output from decryption means 22 would produce the level 2 encrypted signal which is not usable with the HDTV receiver 10 since the level 2 signal would be further encrypted by encryption circuit 20. Even without decryption means 22 (a jumper across terminals 21 and 23), level 2 decryption by decryption means 26 would still leave such a signal with level 1 encryption. Thus the recorded tape would be useless.

Thus the invention enables the movie industry to control the viewings of its product offerings and enables a concentration of marketing focus by permitting product releases simultaneously to theater, cable television and VCR audiences.

What is claimed is:

1. In combination:

an HDTV receiver for receiving a level 1 encrypted HDTV signal at an input terminal and including an output port and an input port;

level 1 decryption means coupled between said output port and said input port;

level 2 encryption means in said HDTV receiver coupled between said input terminal and said output port for further encrypting said level 1 HDTV signal with a level 2 encryption and supplying the resultant level 1 and level 2 encrypted signal to said output port;

level 2 decryption means in said HDTV receiver coupled to said input port; and means for processing HDTV signals from said level 2 decryption means for display.

2. The combination of claim 1 wherein said HDTV signal is compressed and wherein said processing means includes means for expanding said HDTV signal.

3. The combination of claim 2 wherein said level 1 decryption means is controllable to restrict its operability.

4. The combination of claim 2 wherein said level 2 encryption means and said level 2 decryption means compensate for processing delay in said level 1 encryption means.

5. The combination of claim 2 further including random number generating means for controlling said level 2 encryption and decryption means.

6. The combination of claim 5 wherein said level 2 encryption and decryption means comprise a pair of multipliers.

7. The combination of claim 5 wherein said random number generating means and said level 2 encryption and decryption means are included in an integrated circuit chip.

8. The combination of claim 7 wherein said random number generating means and said level 2 encryption means and said level 2 decryption means are included in an integrated circuit chip.

9. In combination:

an HDTV receiver for receiving a level 1 encrypted compressed HDTV signal at an input terminal and including an output port and an input port;

level 1 decryption means coupled between said output port and said input port, said level 1 decryption means being controllable to restrict its operability;

level 2 encryption means in said HDTV receiver coupled between said input terminal and said output port for further encrypting said level 1 encrypted HDTV signal with a level 2 encryption and for supplying the resultant level 1 and level 2 encrypted signal to said output port;

level 2 decryption means in said receiver coupled to said input port; and means for expanding and processing HDTV signals from said level 2 decryption means for display.

10. The combination of claim 9 further including random number generating means for controlling said level 2 encryption means and said level 2 decryption means.

11. The combination of claim 9 wherein said level 2 encryption means and said level 2 decryption means compensate for processing delay in said level 1 encryption means.

12. A method of controlling playback of recorded HDTV signals comprising:

providing an output port and an input port in an HDTV receiver adapted for receiving an HDTV signal with a level 1 encryption;

further encrypting, in said HDTV receiver, said level 1 encrypted HDTV signal with a level 2 encryption and coupling the resultant level 1 and level 2 encrypted signal to said output port;

providing a level 1 decryptor between said input port and said output port for decrypting said level 1 encryption in said level 1 and level 2 encrypted signal and returning a level 2 encrypted signal to said input port; and decrypting said level 2 encrypted signal in said HDTV receiver to develop said HDTV signal.

13. The method of claim 12 further comprising controlling the operability of said level 1 decryptor to limit playback of said recorded HDTV signals.

14. The method of claim 12 wherein said encrypting and decrypting are accomplished with multipliers that are supplied with a random number key.

* * * * *